(12) United States Patent
Ma (10) Patent No.: US 7,419,308 B2
(45) Date of Patent: Sep. 2, 2008

(54) FIBER BUNDLE TERMINATION WITH REDUCED FIBER-TO-FIBER PITCH

(75) Inventor: Jian Ma, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/521,776

(22) Filed: Sep. 15, 2006

(65) Prior Publication Data

US 2008/0069502 A1    Mar. 20, 2008

(51) Int. Cl.
 *G02B 6/40* (2006.01)
(52) U.S. Cl. .......................................... 385/54; 385/115
(58) Field of Classification Search ................ 385/54, 385/115–121
 See application file for complete search history.

(56) References Cited

U.S. PATENT DOCUMENTS

| | | | |
|---|---|---|---|
| 3,912,362 A | 10/1975 | Hudson | |
| 4,265,699 A | 5/1981 | Ladany | |
| 4,469,554 A | 9/1984 | Turner | |
| 4,853,020 A | 8/1989 | Sink | |
| 4,932,747 A | 6/1990 | Russell et al. | |
| 5,558,669 A * | 9/1996 | Reynard | 606/15 |
| 5,621,829 A | 4/1997 | Ford | |
| 6,243,520 B1 | 6/2001 | Goldman | |
| 6,444,133 B1 | 9/2002 | Fajardo et al. | |
| 6,655,852 B2 | 12/2003 | Bolle | |
| 6,674,947 B2 | 1/2004 | Camlibel et al. | |
| 6,726,372 B1 | 4/2004 | Sherrer et al. | |
| 6,827,500 B2 | 12/2004 | Basavanhally et al. | |
| 6,907,180 B2 | 6/2005 | Yamada | |
| 7,209,615 B2 * | 4/2007 | Fishteyn | 385/115 |
| 2004/0093906 A1 * | 5/2004 | Gerstner et al. | 65/409 |

* cited by examiner

*Primary Examiner*—Frank G Font
*Assistant Examiner*—Eric Wong
(74) *Attorney, Agent, or Firm*—Armstrong Teasdale LLP (57) ABSTRACT

A method of fabrication of a fiber bundle termination with reduced fiber-to-fiber pitch which includes reducing the outside diameter of fibers in the fiber bundle by etching and provides means for preventing breakage of the etched fibers during etching and assembly. A high yield fabrication and assembly process is described.

41 Claims, 6 Drawing Sheets

FIBER BUNDLE TERMINATION WITH REDUCED FIBER-TO-FIBER PITCH

BACKGROUND OF THE INVENTION

Modern information systems require a high speed data transmission. Fiber optical systems provide a high bandwidth and are widely use in communication systems. Fiber optic bundles are commonly utilized in fiber optical systems to increase the communication bandwidth. Many methods of creating fiber bundles exist. They include crimping, tie cables, insertion of fibers into ferrules, etc. Of particular interest are the efforts to reduce fiber-to-fiber pitch because many applications require or benefit from fiber bundles having a small fiber-to-fiber pitch. For example, a liquid crystal beam steering-based 1×6 fiber optical switch, which inherently utilizes a small steering angle, requires fiber bundles with fiber-to-fiber pitch of 50 μm or less to operate. In another example, in MEMS (Micro Electronic Mechanical System) micromirror-based switch, the beam deflection angle is proportional to micromirror's tilt angle. A fiber bundle with smaller fiber-to-fiber pitch requires a smaller micromirror tilt angle which would reduce driving voltage, thus increasing system's reliability and reducing its power consumption.

Another example is a fiber coupler (such as power monitoring tap coupler), that couples light from one fiber to other fibers. In a fiber coupler assembly, a lens is usually used to couple the light into fibers. A fiber bundle with reduced fiber-to-fiber pitch results in fibers being closely packed at the optical axis of the lens which improves device's coupling efficiency.

Circulators, variable optical attenuators, wavelength selective switches, reconfigurable optical add/drop modules, chromatic dispersion compensators, etc. also benefit from utilizing fiber bundles with reduced fiber-to-fiber pitch.

Typical single mode fibers have an inner core (active area) diameter of about 9 micrometers (μm) and an outside diameter of 125 μm. In order to produce a fiber bundle with a reduced fiber-to-fiber pitch, the fiber outside diameter has to be reduced.

A reduction of the outside diameter of the fibers also results in an increase of the packing fraction of the fiber bundle, which is defined as the ratio of the information-carrying cross-sectioned area of the fiber bundle (fiber cores) to the total cross-sectioned area of an endface of the fiber bundle. The increased packing fraction of the fiber bundle is beneficial for applications where increased density of light is important.

A method of reducing fiber outside diameter is disclosed in the U.S. Pat. No. 3,912,362 to Hudson, hereinafter referred to as '362 patent. The '362 patent discloses fiber bundle termination where fibers are etched and inserted into a ferrule and secured to each other and the ferrule by adhesive. The '362 patent discloses fibers with an inner active core having a large diameter. The inner core diameter of processed fibers disclosed in '362 patent is 3.6 mils, which is equivalent to about 91.4 μm, and an outer diameter of those fibers equal to 5.5 mils (139.7 μm). The '362 patent teaches etching the fibers to reduce the outer diameter to 3.8 mils (96.5 μm). Because the after-etch diameter of the fibers was still very large, fiber breakage was not a concern, and special means to prevent breakage of the fibers were not required.

Accordingly, a need exists to create a fiber bundle with a fiber-to-fiber pitch smaller than 50 μm for fibers having small inner core diameter, typically in the range of about 3.5 μm to about 10 μm. That requires the after-etch fiber outside diameter of less than 50 μm. Fibers with small outside diameter are extremely fragile and are very difficult to handle. This problem is overcome by the hereinafter disclosed fabrication method that stabilizes the fibers and reduces the possibility of breakage associated with a small after-etch fiber outside diameter.

SUMMARY OF THE INVENTION

A fiber bundle termination with reduced fiber-to-fiber pitch and the associated process capable of fabricating fiber bundles with a fiber-to-fiber pitch much smaller than the diameter of the original fiber is disclosed. The original fibers are first assembled into a holder that provides mechanical protection, and the outside diameters of the fibers protruding from the ferrule are subsequently reduced through a chemical etching process. The etched fibers are then assembled into a fiber bundle termination. The fibers are secured in the termination that packs the etched fiber tightly achieving a small fiber-to-fiber pitch. The termination also provides mechanical protection, and reduces a possibility of breakage of the fibers during the assembly process. Further, a high yield fabrication and assembly process is disclosed.

DETAILED DESCRIPTION

An improved fiber bundle termination and method of manufacturing is disclosed wherein fiber-to-fiber pitch is minimized by reducing the fiber outside diameter and then packing the fibers with reduced diameter tightly into a fiber bundle termination.

Reduction of the outer diameter of the fibers may be achieved by etching the cladding of the fibers. Provision is also made to prevent breakage of the etched fibers.

The fiber bundle termination with reduced fiber-to-fiber pitch may be used with fiber optical switches, fiber couplers, circulators, variable optical attenuators, wavelength selective switches, reconfigurable optical add/drop modules, chromatic dispersion compensators, etc.

Figure 1:
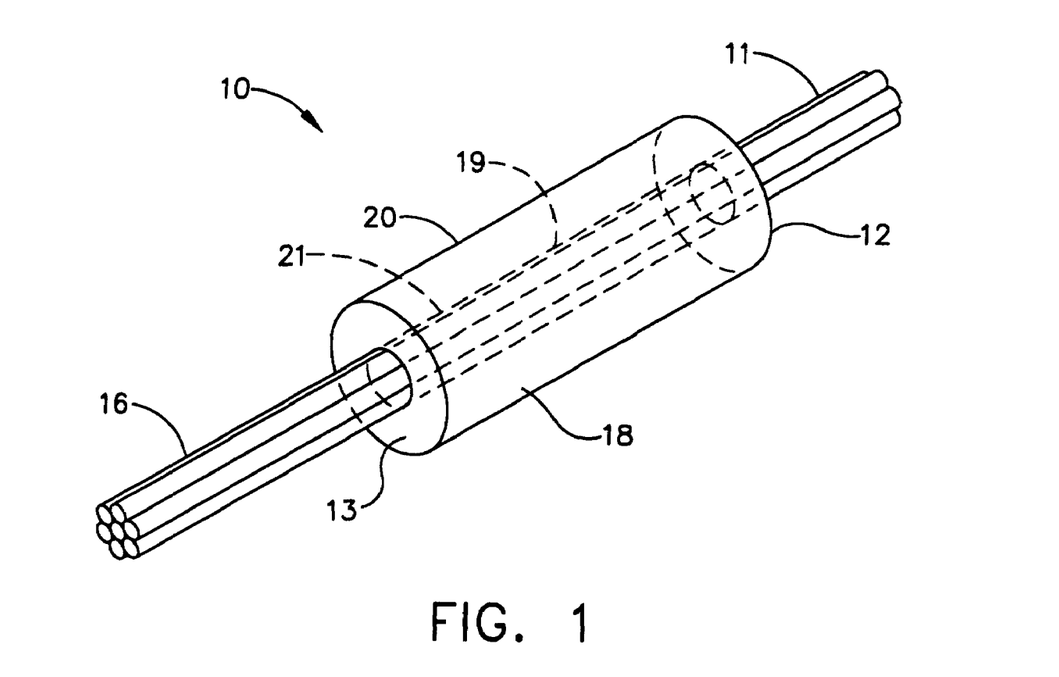
FIG. 1 is an illustration showing unetched fibers secured by a holder into a fiber bundle.
Figure 5:
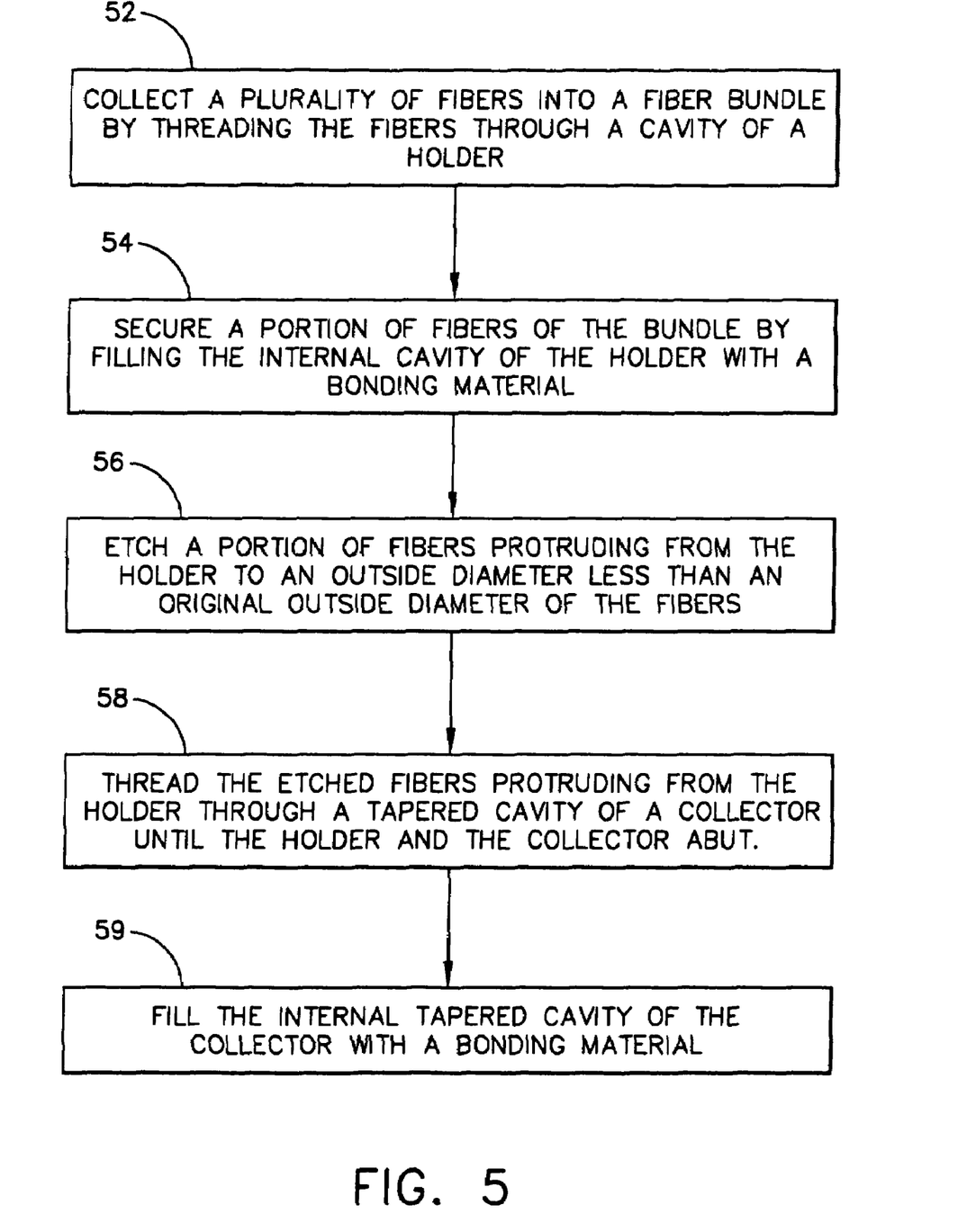
FIG. 5 illustrates a flow chart of the fiber bundle termination assembly process.

Referring now to FIG. 1 and steps 52 and 54 of FIG. 5, an improved fiber bundle termination 10 is created by threading a plurality of fibers 11 through a holder 20 having a first endface 12, second endface 13, and inner cavity 19. The fibers 11 are fixedly secured in the holder 20. A portion 16 of the fiber bundle fibers protrudes from the second endface 13 of the holder. The 25 mm length was used for the holder 20. The length of the protruding portion 16 of the fibers 11 is approximately 14 mm. A preferred range for the protruding portion 16 may be 10 to 20 mm. The fibers 11 may be fixedly secured, for example, by filling the holder 20 with a bonding material 21, which can be an epoxy, glue, or any other suitable material, or by a surface tension between the fibers of the fiber bundle and walls of the inner cavity 19 of holder 20. The filling of the holder 20 may be done prior, after, or during the threading of the fibers through the holder. A preferred bonding material 21 is an epoxy that has low shrinkage during curing, such as EPO-TEK 353ND. The curing requirements and process are well known to a person skilled in the art.

Figure 2:
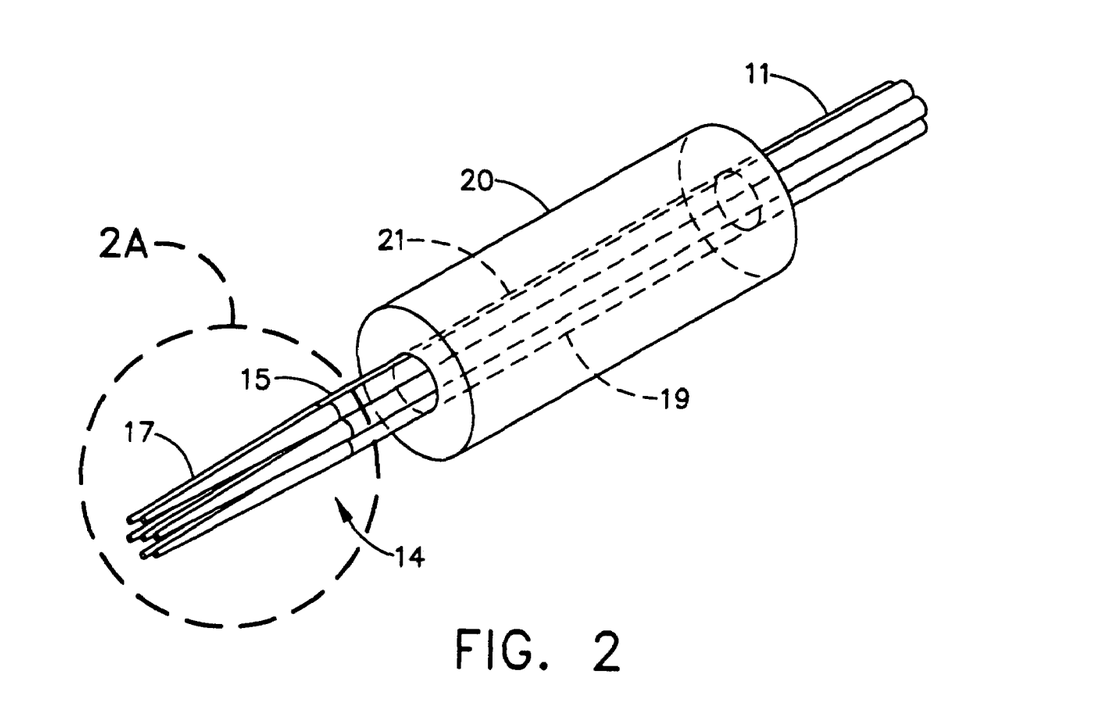
FIG. 2 is an illustration showing secured fiber bundle after the etch step.
Figure 2A:
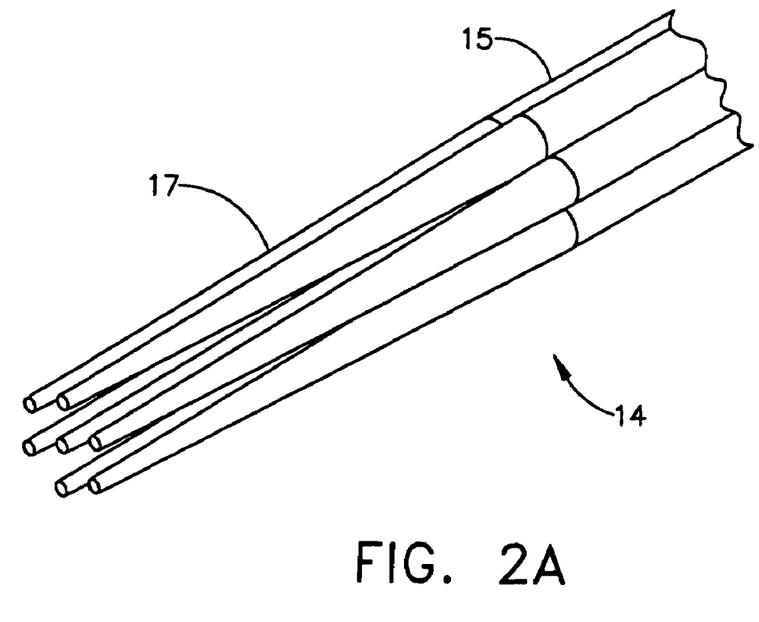
FIG. 2a is an illustration showing an expanded view of the etched fibers.

In the next step, illustrated in FIG. 2 and FIG. 2a and outlined in step 56 of FIG. 5, a partial length 17 of the protruded portion 16 of fibers 11 is etched to achieve a reduction in the outside diameter of the fibers. To prevent fiber breakage at the second endface 13 of the holder 20, it is not desirable to etch the whole length 16 of the protruded fibers. About 1 to 5 mm portion 15 of the protruded fibers 16 closest to the holder 20 is left unetched. The etched portion 17 and the unetched portion 15 together comprise the after-etch protruding fibers 14.

While outside diameter of fibers 11 may vary, commercially available fibers 11 typically have an outside fiber diameter of about 125 μm. The process disclosed hereinafter is currently capable of achieving the after-etch outside fiber diameter of 35 μm. Telecommunication single mode fibers have inner core diameters typically in the range of about 3.5 to about 10 μm. The fiber core diameter is chosen according to the intended use.

Theoretically, it is possible to etch off substantially all the cladding of the fibers, but the smaller the after-etch outside diameter of the fibers, the more likely the breakage of the fibers during processing and assembly. In addition, when bonding material is to be applied, it is beneficial not to etch off all fiber cladding due to the fact that if all cladding is removed, bonding material will act as cladding and may degrade the performance of the fibers by, for example, creating absorption losses.

Fibers 11 can be etched using known chemical processes to the value of the after-etch outside fiber diameter substantially equal to the fiber's inner core diameter. An etching solution can be chosen based on the type of material used for cladding.

Some glass claddings, for example, may be etched with acids, such as BOE (Buffered Oxide Etch), hydrofluoric acid, phosphoric acids, or other suitable acids, while other glasses may be etched with alkaline solutions, such as sodium hydroxide, potassium hydroxide, or other suitable alkaline solutions. Ultrasonic agitation of the etching solution can be employed to improve uniformity of etching, or other methods can be used to stir the etching solution. A correlation between the properties of etching solutions (type, concentration, temperature, etc.) and the etch rate is well know in the art. The etch duration is related to the etch rate and the thickness of cladding that needs to be removed. The etch rate needs to be calibrated. Etching can also be performed by non liquid etches, such as, for example, plasma etching.

Figure 3:
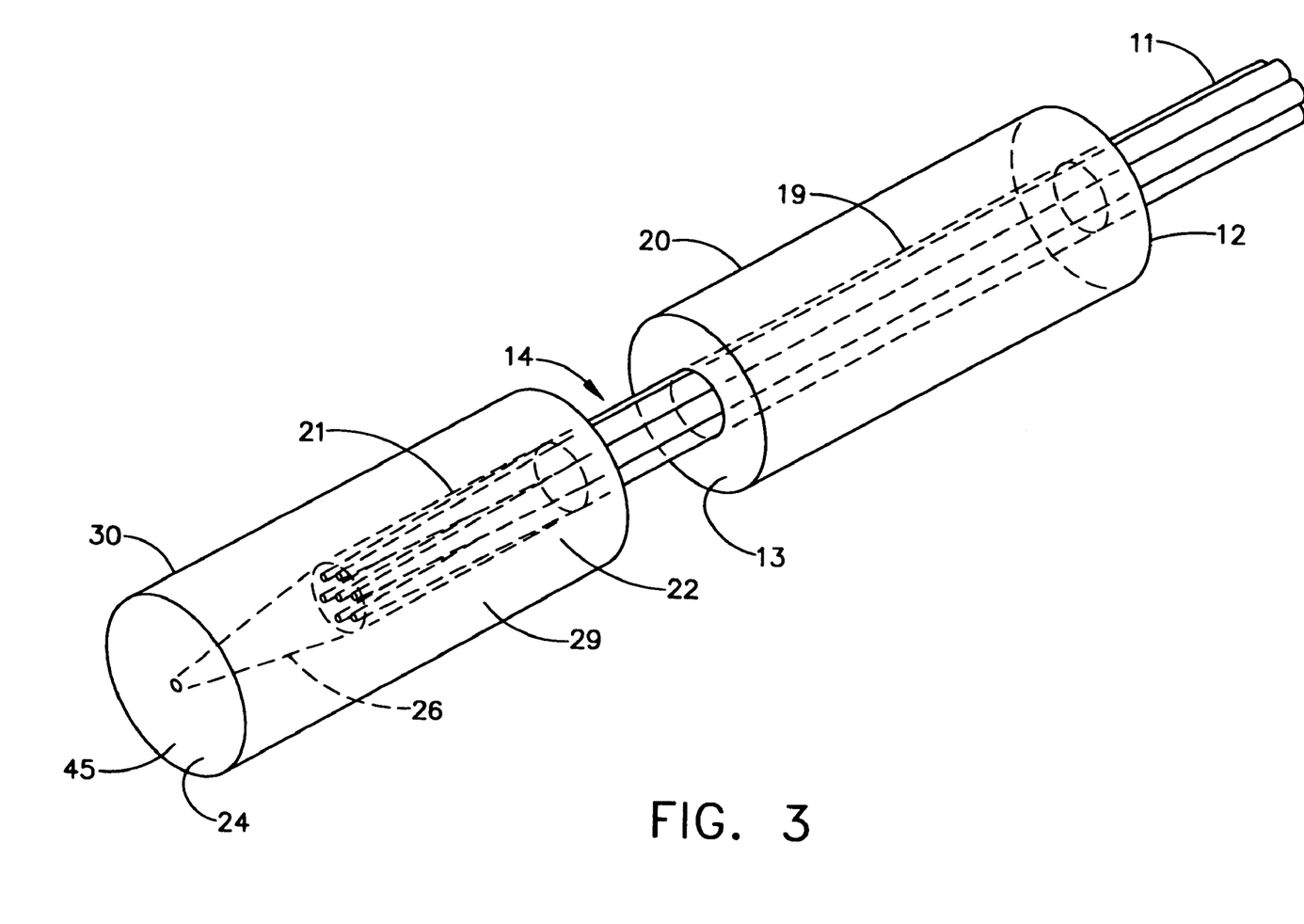
FIG. 3 is an illustration showing the fibers protruded from the holder inserted into a collector.
Figure 4:
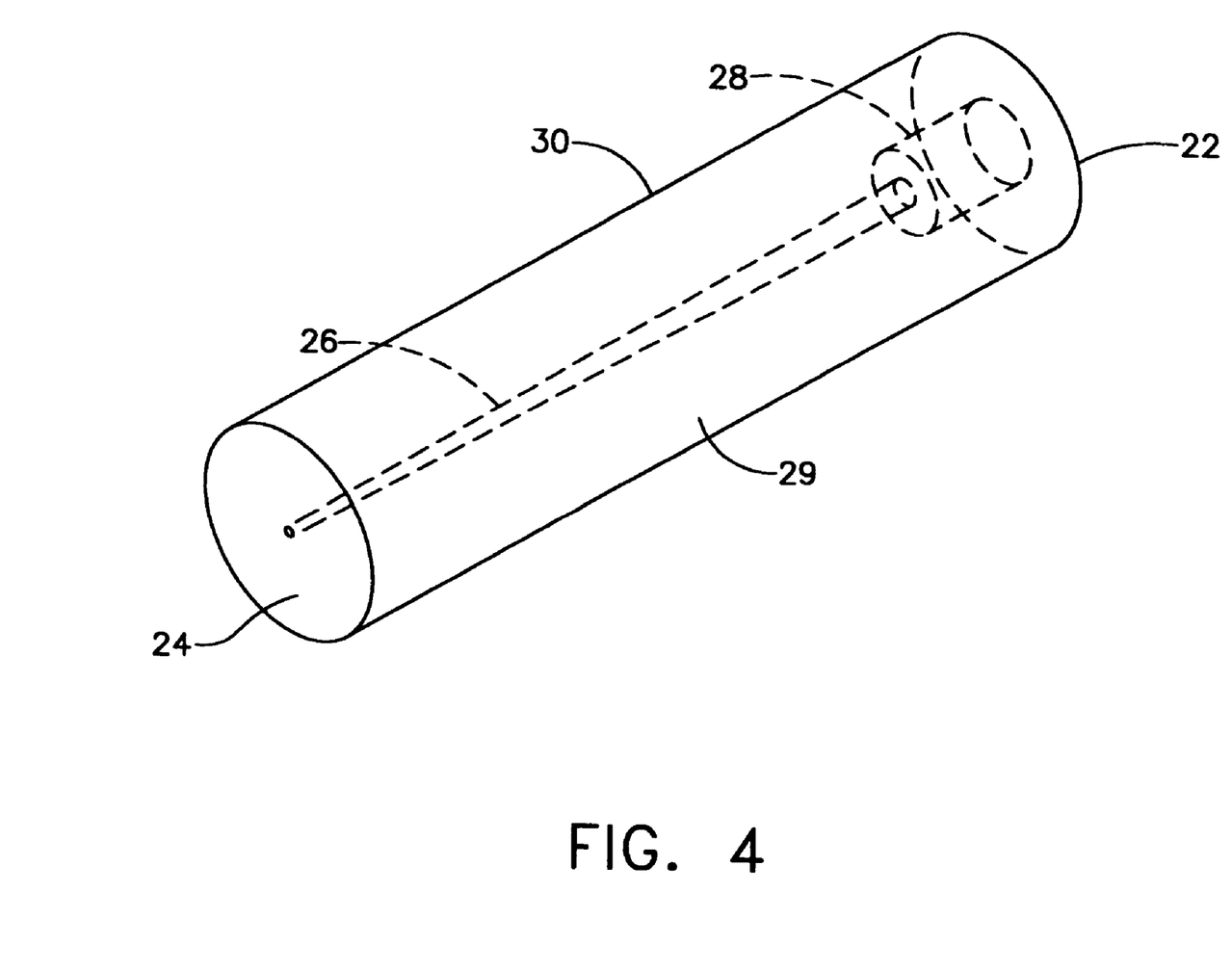
FIG. 4 is an illustration showing a preferred embodiment of the collector including an optional entry point for a bonding material injection.

After etch, as illustrated in FIG. 3 and outlined in steps 58 and 59 of FIG. 5, protruding fibers 14, are threaded through a collector 30, having a first endface 22, a second endface 24, an outside wall 29, and a tapered cavity 26 therebetween, with the tapered cavity 26 having a larger diameter at the first endface 22 than at the second endface 24. The protruding fibers 14 are inserted into the first endface 22. The length of the collector 30 may be about 0.5 mm shorter than the length of protruding fibers 14. The tapered cavity 26 may be circular, elliptical hexagonal, rectangular, or of any other geometrical configuration. The cavity is tapered from the first endface 22 to the second endface 24. This taper arrangement allows the protruding fibers 14 to be easily fitted into a larger opening of the tapered cavity 26 at the first endface 22. The tapering of the cavity compresses the fiber bundle 10 by channeling the fibers into a smaller cross sectional area thereby creating a fiber bundle 10 exhibiting a small fiber-to-fiber pitch at the second endface 24 of the collector 30. As illustrated in FIG. 4, an entry point at the first endface 22 may optionally have a larger diameter initial non-tapered cavity to facilitate injection of a bonding material. The cross sectional area of the cavity at the second endface 24 of collector 30 accommodates a plurality of the fibers 11 in the fiber bundle 10 with the least cross sectional area possible. The collector 30 may be filled by a bonding material to fixedly secure the fibers. The bonding material can be an epoxy, glue, or any other suitable material. Filling of the collector 30 with the bonding material may be done prior, after, or during the initial treading of the fibers 11 through the collector 30. It is preferred that the second endface surface 13 of holder 20 and the first endface surface 22 of collector 30 come into a contact with each other and that they be substantially parallel to each other.

Fibers 14 protruding from the second endface 24 of collector 30 may be cut by cleaving, laser trimming, or by other suitable means. After that, it is necessary to polish the cut ends of the fibers at the second endface 24 of the collector 30 to make the end of the fiber bundle at the second endface 24 to be substantially in the same plane as the second endface 24. To further protect fibers from damage during the polishing step, a bonding material 21, such as an epoxy, can be applied over the protruded portion of the fibers 14, forming a glob, and cured, if necessary, before a polishing step. This will further limit the mechanical disturbance of the fibers 11 due to the polishing step and prevent fiber cracking.

The next step may be to deposit an antireflective coating 45 on the polished endfaces of the fibers that are in the same plane with the second endface 24 of collector 30. The second endface 24 of collector 30 may also be coated simultaneously with the fibers. The process of applying antireflective coating is well known in the art.

Figure 6:
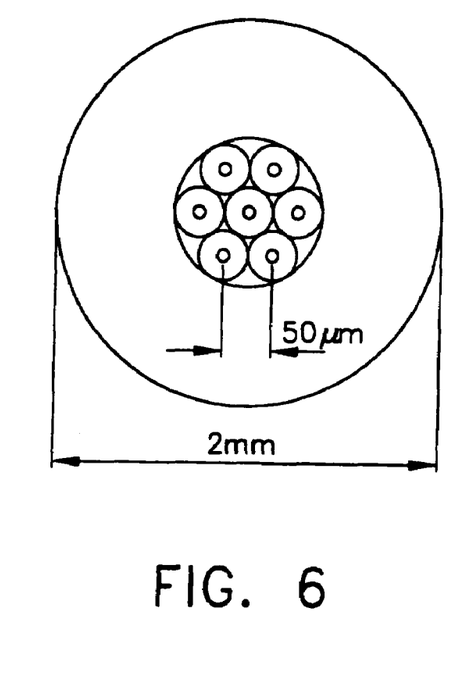
FIG. 6 is an illustration showing a cross-section of the collector for one of the embodiments (with outside fiber diameter reduced to 50 μm).

FIG. 6 illustrates a cross-section of the collector 30 for one of the embodiments (with outside fiber diameter reduced to 50 μm.)

Holder 20 and collector 30 may be made from glass, ceramic, plastic, metal, or any other suitable material.

To make the fiber bundle termination more robust, bonding material 21 may be applied between the second endface 13 of holder 20 and the first endface 22 of collector 30 and cured.

Figure 7:
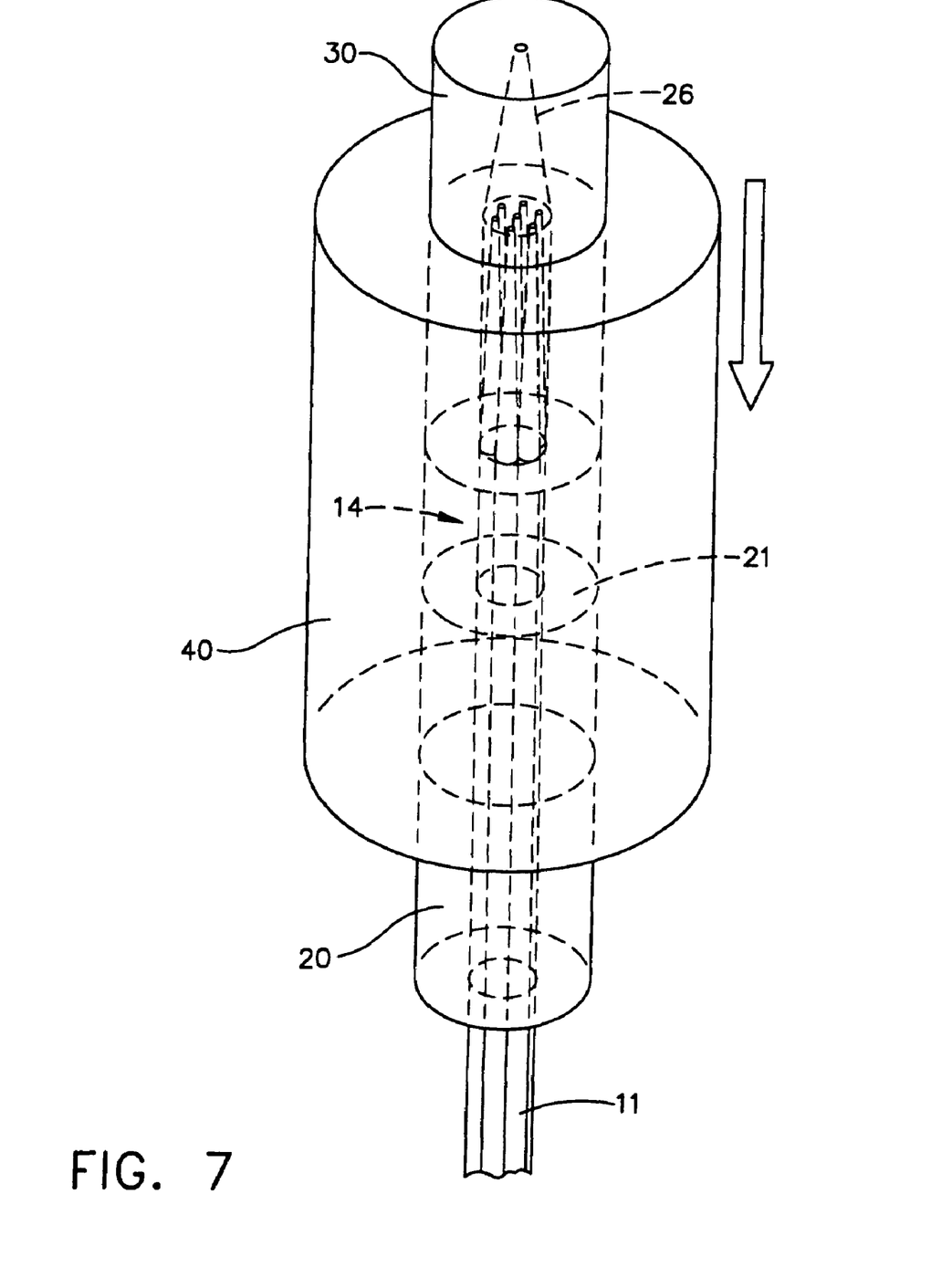
FIG. 7 illustrates a high-yield fabrication and assembly method.

FIG. 7 illustrates a preferred method of manufacturing a fiber bundle termination a self-aligned assembly that utilizes a guide 40. The guide 40 can be either a reusable fixture or a part of integrated final assembly. Guide 40 is designed to receive holder 20 and collector 30. The outer diameter of the holder 20 is approximately the same as the outer diameter of the collector 30. Guide 40 is hollow with an interior diameter slightly larger than outside diameters of holder 20 and collector 30. The inner diameter of the guide 40 is designed to allow holder 20 and collector 30 to slide into guide 40 with an application of a minimal force and also to prevent a voluntarily movement of the holder 20 and the collector 30 inside the guide 40.

As illustrated in FIG. 7, after the fiber bundle 11 is secured by the holder 20 and protruding fibers 16 etched to become after-etch reduced-diameter protruding fibers 14, the holder 20 is inserted into the guide 40 part of the way so that said protruded fibers 14 remain inside the hollow of the guide 40. In the next step, collector 30 may be lowered into the guide 40 until the first endface 22 of the collector 30 and the second endface 13 of holder 20 come into a contact. The collector 30 may be filled with the bonding material, where said filling can be performed prior, after, or during the insertion of collector 30 into holder 40. A preferred method is to fill the cavity with the bonding material prior to the insertion of the fibers. A preferred bonding material is an epoxy selected from the group that has low shrinkage during curing, such as EPO-TEK 353ND. The curing requirements and process are well known to a person skilled in the art.

The holder 20 and the collector 30 may be bonded together by applying the bonding material between the adjacent endface surfaces 13 and 22.

The guide 40 may be removed or it may be left in place to become a part of the final assembly. In one embodiment, the guide 40 may be bonded to holder 20 and/or collector 30 by applying a bonding material between the inside walls of the hollow of the guide 40 and the outside wall 18 of the holder 20 and/or the outside wall 29 of the collector 30, and curing it.

The holder 20, the collector 30, and the guide 40 may be made from glass, ceramic, plastic, metal, or any other suitable material.

The invention claimed is:

1. A method of fabricating a fiber bundle termination with reduced fiber-to-fiber pitch comprising the steps of:
   (a) fixedly collecting a plurality of fibers into a fiber bundle by threading said fibers through a holder comprising a first endface and a second endface and securing a portion of said fibers in said bundle by filling said holder with a bonding material;
   (b) etching a portion of said fibers protruding from said holder to an outside diameter less than an original outside diameter of said fibers;
   (c) providing a collector comprising an internal cavity and a first endface and a second endface, with said cavity being initially non-tapered from said first endface to facilitate injection of a bonding material and then being tapered to said second endface;
   (d) packing said etched fibers tightly to achieve reduced fiber-to-fiber pitch by threading said etched fibers protruding from said holder through said tapered internal cavity of said collector, starting at first endface of said collector, with said first endface coming in contact with said holder; and
   (e) filling the non-tapered portion of said cavity of said collector with a bonding material.

2. The method of claim 1 wherein said bonding material is one of an epoxy or a glue.

3. The method of claim 1 wherein said holder is composed of a material selected from the group consisting of glass, ceramic, plastic, and metal.

4. The method of claim 1 wherein said collector is composed of a material selected from the group consisting of glass, ceramic, plastic, and metal.

5. The method of claim 1 wherein the step of filling of said holder and said collector with said bonding material can be performed prior, after, or during the step of threading of the fibers through said holder and said collector.

6. The method of claim 1 wherein said bonding material is cured to achieve a necessary bonding property.

7. The method of claim 1 further comprising the step of cutting said protruding fibers a short distance from said second endface using one of cleaving or laser trimming.

8. The method of claim 1 further comprising the step of applying a bonding material over the fibers protruding from said second endface of said collector.

9. The method of claim 1 further comprising a step of polishing endfaces of said fibers at said second endface of said collector to make the end of the fiber bundle to be substantially in the same plane as the second endface of said collector.

10. The method of claim 9 further comprising the step of depositing an antireflective coating on said polished endfaces of said fibers at said second endface of said collector.

11. The method of claim 1 further comprising the step of applying a bonding material on one of said first endface of said collector or said second endface of said holder.

12. The method of claim 11 further comprising the step curing said bonding material to achieve a necessary bonding property.

13. A method of manufacturing a fiber bundle termination with reduced fiber-to-fiber pitch comprising the steps of:
   (a) fixedly collecting a plurality of fibers into a fiber bundle by threading said fibers through a holder and securing a portion of said fibers of said bundle by filling said holder with a bonding material;
   (b) etching a portion of said fibers protruding from said holder to an outside diameter less than an original outside diameter of said fibers;
   (c) inserting said holder into an internal cavity of a guide with said protruding fibers remaining inside the hollow of said guide;
   (d) packing said reduced-outside-diameter fibers tightly to achieve reduced fiber-to-fiber pitch by lowering a collector having a first endface and a second endface and an internal cavity tapered from said first endface to said second endface into said guide with said etched fibers protruded from said holder being threaded through said collector until said first endface of said collector abuts said second endface of said holder; and
   (e) filling said internal cavity of said collector with a bonding material.

14. The method of claim 13 wherein a bonding material includes at least one of an epoxy or glue.

15. The method of claim 13 wherein the step of filling of said holder and said collector with said bonding material can be performed prior, after, or during the step of threading of the fibers through said holder and said collector.

16. The method of claim 13 wherein said holder is composed of a material selected from the group consisting of glass, ceramic, plastic, and metal.

17. The method of claim 13 wherein said collector is composed of a material selected from the group consisting of glass, ceramic, plastic, and metal.

18. The method of claim 13 wherein said bonding material is cured to achieve a necessary bonding property.

19. The method of claim 13 further comprising a step of cutting said the protruding fibers a short distance from said second endface using one of cleaving or laser trimming.

20. The method of claim 13 further comprising a step of applying a bonding material over the fibers protruding from said second endface of said collector.

21. The method of claim 13 further comprising a step of polishing endfaces of said fibers at said second endface of said collector to make the end of the fiber bundle to be substantially in the same plane as the second endface of said collector.

22. The method of claim 21 further comprising a step of depositing an antireflective coating on said polished endfaces of said fibers at said second endface of said collector.

23. The method of claim 13 further comprising a step of applying a bonding material on said first endface of said collector and/or on a said second endface of said holder.

24. The method of claim 23 further comprising a step of curing said bonding material to achieve a necessary bonding property.

25. The method of claim 13 further comprising a step of applying a bonding material on the walls of the inside cavity of said guide and/or to the outside walls of said holder and said collector.

26. The method of claim 25 further comprising a step of curing said bonding material to achieve a necessary bonding property.

27. A fiber bundle termination with reduced fiber-to-fiber pitch comprising:
a holder comprising a first endface and a second endface;
a bundle of fibers having an etched portion with an outside diameter less than an original outside diameter of said fibers;
said holder being capable of holding a portion of unetched portion of said fiber bundle;
a collector comprising a first endface, a second endface, and an internal cavity;
said internal cavity being initially non-tapered from said first endface and then being tapered to said second endface;
said collector being capable of receiving fiber bundle protruding from said second endface of said holder and packing said etched fibers tightly to achieve reduced fiber-to-fiber pitch; and
a bonding material within the non-tapered portion of said internal cavity capable of securing said fiber bundle.

28. The fiber bundle termination of claim 27 wherein said second interface of said holder and said first interface of said collector are substantially parallel.

29. The fiber bundle termination of claim 27 wherein said second interface of said holder and said first interface of said collector are substantially in a contact.

30. The fiber bundle termination of claim 27 wherein a bonding material includes one of an epoxy or a glue.

31. The fiber bundle termination of claim 27 wherein said holder is composed of a material selected from the group consisting of glass, ceramic, plastic, and metal.

32. The fiber bundle termination of claim 27 wherein said collector is composed of a material selected from the group including consisting of glass, ceramic, plastic, and metal.

33. The fiber bundle termination of claim 27 wherein said second endface of said collector is polished together with endfaces of protruding fiber bundle.

34. The fiber bundle termination of claim 27 wherein an end of said fiber bundle is substantially in the same plane as said second endface of said collector.

35. The fiber bundle termination of claim 27 wherein said endfaces of said polished fibers is coated with antireflective coating.

36. A method of transmitting signal using a fiber termination bundle with reduced fiber-to-fiber pitch comprising the steps of:
(a) securing an unetched portion of the fiber bundle with a holder;
(b) packing the etched fibers of the fiber bundle tightly in a tapered portion of an internal cavity of a collector to achieve reduced fiber-to-fiber pitch;
(c) injecting a bonding material into a non-tapered portion of the internal cavity;
(d) connecting the etched portion of the fiber bundle to a network; and
(e) transmitting a signal through the network.

37. A method of switching a signal using a fiber termination bundle with reduced fiber-to-fiber pitch comprising the steps of:
(a) securing an unetched portion of the fiber bundle with a holder;
(b) packing the etched fibers of the fiber bundle tightly in a tapered portion of an internal cavity of a collector to achieve reduced fiber-to-fiber pitch;
(c) injecting a bonding material into a non-tapered portion of the internal cavity;
(d) connecting the etched portion of the fiber bundle to a fiber optical switch; and
(e) transmitting a signal through the fiber optical switch.

38. A network for transmitting a signal using a fiber bundle termination with reduced fiber-to-fiber pitch comprising:
a network for receiving said signal; and
a fiber bundle having an unetched portion secured by a holder and an etched portion packed tightly in a tapered portion of an internal cavity of a collector to achieve reduced fiber-to-fiber, pitch at least some of the etched portion bonded within a non-tapered portion of the internal cavity with a bonding material, with said etched portion of said fiber bundle connected to said network.

39. A network for switching a signal using a fiber bundle termination with reduced fiber-to-fiber pitch comprising:
a fiber optical switch for receiving said signal; and
a fiber bundle having an unetched portion secured by a holder and an etched portion packed tightly in a tapered portion of an internal cavity of a collector to achieve reduced fiber-to-fiber pitch, at least some of the etched portion bonded within a non-tapered portion of the internal cavity with a bonding material, with said etched portion of said fiber bundle connected to said fiber optical switch.

40. The method of claim 1 further comprising the step of inserting said bolder and said collector into an internal cavity of a guide.

41. The fiber bundle termination of claim 27 further comprising a guide comprising an internal cavity, said holder and said collector within said internal cavity of said guide.

* * * * *